United States Patent
Hofer

(10) Patent No.: US 11,247,558 B2
(45) Date of Patent: Feb. 15, 2022

(54) TRANSMISSION ARRANGEMENT FOR THE CONTROLLABLE DISTRIBUTION OF A DRIVE TORQUE FROM AN INPUT ELEMENT TO AT LEAST ONE OUTPUT ELEMENT IN AN ALL-WHEEL DRIVE TRAIN OF AN ALL-WHEEL DRIVE MOTOR

(71) Applicant: MAGNA POWERTRAIN GMBH & CO KR, Lannach (AT)

(72) Inventor: Gerhard Hofer, Pinggau (DE)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 278 days.

(21) Appl. No.: 16/477,932

(22) PCT Filed: Dec. 11, 2017

(86) PCT No.: PCT/EP2017/082269
§ 371 (c)(1),
(2) Date: Jul. 15, 2019

(87) PCT Pub. No.: WO2018/133998
PCT Pub. Date: Jul. 26, 2018

(65) Prior Publication Data
US 2019/0366842 A1   Dec. 5, 2019

(30) Foreign Application Priority Data

Jan. 18, 2017   (DE) ............... 10 2017 200 724.9

(51) Int. Cl.
*B60K 17/348*   (2006.01)
*B60K 17/354*   (2006.01)
(Continued)

(52) U.S. Cl.
CPC .......... *B60K 17/348* (2013.01); *B60K 17/354* (2013.01); *B60K 6/48* (2013.01);
(Continued)

(58) Field of Classification Search
None
See application file for complete search history.

(56) References Cited

U.S. PATENT DOCUMENTS 8,182,386 B2 *   5/2012   Rosemeier ............... B60K 6/52
                                                475/150
8,663,051 B2 *   3/2014   Sten ........................ F16H 48/36
                                                475/205

(Continued)

FOREIGN PATENT DOCUMENTS

CN   102459953 A   5/2012
CN   102596612 A   7/2012
(Continued)

OTHER PUBLICATIONS

International Search Report and Written Opinion dated Mar. 14, 2018 from corresponding International Patent Application No. PCT/EP2017/082269 with English translation of International Search Report.

(Continued)

*Primary Examiner* — Dirk Wright
(74) *Attorney, Agent, or Firm* — Dickinson Wright PLLC

(57) ABSTRACT

A transmission arrangement for the controllable distribution of a drive torque from an input element to at least one output element in an all wheel drive train of an all wheel drive motor vehicle, comprising an additional drive unit, a first transmission part region, the first transmission part region being drive-connected directly or indirectly to the additional drive unit, a second transmission part region, the first transmission part region being connected indirectly via the second transmission part region to the output element, and a selector element, it being possible for the selector element to be moved into three shifting positions, namely a first shifting position, in which the first transmission part region is drive-connected to the input element, a second shifting (Continued)

Figure 1:
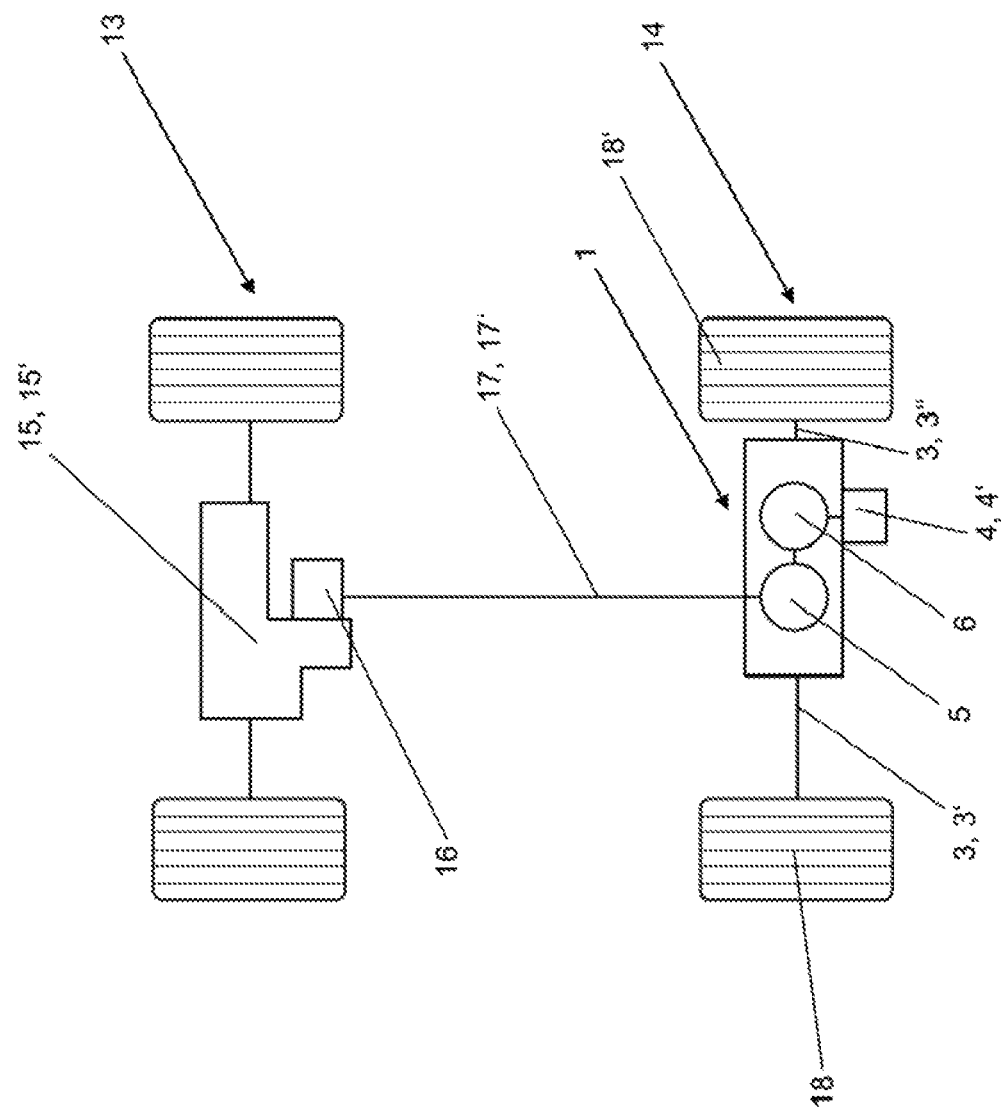

position, in which the first transmission part region is drive-connected to the second transmission part region, and a third shifting position, in which the first transmission part region is drive-connected neither to the input element nor to the second transmission part region.

16 Claims, 5 Drawing Sheets

(51) Int. Cl.
 *B60K 6/48* (2007.10)
 *B60K 6/52* (2007.10)
(52) U.S. Cl.
 CPC ........ *B60K 6/52* (2013.01); *B60K 2006/4808* (2013.01); *B60K 2006/4841* (2013.01)

(56) References Cited

U.S. PATENT DOCUMENTS

| | | | | |
|---|---|---|---|---|
| 8,911,315 B2 * | 12/2014 | Kaltenbach | ........... | F16H 37/065 475/5 |
| 9,409,473 B2 * | 8/2016 | Kaltenbach | ............. | F16H 3/006 |
| 9,637,022 B2 * | 5/2017 | Gavling | ................ | B60L 15/025 |
| 10,569,647 B2 * | 2/2020 | Yamamura | ......... | B60K 23/0808 |
| 11,002,350 B2 * | 5/2021 | Waltz | .................... | B60K 17/08 |
| 2012/0058855 A1 | 3/2012 | Sten | | |
| 2013/0109524 A1 | 5/2013 | Kaltenbach et al. | | |

FOREIGN PATENT DOCUMENTS

| | | | | |
|---|---|---|---|---|
| CN | 104029592 A | 9/2014 | | |
| CN | 104442341 A | 3/2015 | | |
| CN | 105599584 A | 5/2016 | | |
| DE | 3640041 C1 | 7/1987 | | |
| DE | 102011085198 A1 * | 5/2013 | ........... | B60W 10/08 |
| DE | 102011085201 A1 | 5/2013 | | |
| DE | 102011088668 A1 | 6/2013 | | |
| DE | 102013202382 A1 | 8/2014 | | |
| DE | 102013009081 A1 | 12/2014 | | |
| EP | 2946963 A1 | 11/2015 | | |
| GB | 2438609 A | 12/2007 | | |

OTHER PUBLICATIONS

German Search Report dated Oct. 13, 2017 from corresponding German Patent Application No. 102017200724.9.
Chinese Search Report; Chinese Appl. No. 2017800830184; dated Oct. 29, 2021; 2 pages.

* cited by examiner

TRANSMISSION ARRANGEMENT FOR THE CONTROLLABLE DISTRIBUTION OF A DRIVE TORQUE FROM AN INPUT ELEMENT TO AT LEAST ONE OUTPUT ELEMENT IN AN ALL-WHEEL DRIVE TRAIN OF AN ALL-WHEEL DRIVE MOTOR

CROSS-REFERENCE TO RELATED APPLICATIONS

This application is a National Stage of International Application No. PCT/EP2017/082269 filed Dec. 11, 2017, which claims priority to German Application No. DE 10 2017 200 724.9 filed Jan. 18, 2017. The entire disclosures of each of the above applications are incorporated herein by reference.

FIELD OF THE INVENTION

The present invention relates to a transmission arrangement for the controllable distribution of a drive torque from an input element to at least one output element in an all wheel drive train of an all wheel drive motor vehicle, comprising an additional drive unit, a first transmission part region, the first transmission part region being drive-connected directly or indirectly to the additional drive unit, a second transmission part region, the first transmission part region being connected indirectly via the second transmission part region to the output element, and a selector element, it being possible for the selector element to be moved into three shifting positions.

BACKGROUND OF THE INVENTION

This section provides background information related to the present disclosure which is not necessarily prior art.

All wheel drive motor vehicles are the object of continuous development, inter alia, on account of the increased fuel consumption and the increasing requirements in relation to exhaust gas emission standards. In this context, in particular, the at least partial electrification of the motor vehicle or the motor vehicle drive train is paramount; the at least partial hybridization of the motor vehicle or the motor vehicle drive manages the balancing act between reduced fuel consumption, sufficient range and satisfactory performance.

For example, in the case of an all wheel drive motor vehicle with a front transverse main drive unit, namely an internal combustion engine, an all wheel drive system is required which makes a variable all wheel drive function possible. Here, the primary axle, that is to say the permanently driven axle, is the front axle and the secondary axle, that is to say the axle which is not driven permanently, is the rear axle. With consideration of the requirement for a variable all wheel drive function, the rear axle is to be capable of switching in as required in a fully variable manner, and is to offer the possibility to transmit the entire available torque in a variable manner via the secondary axle, namely the rear axle. At the same time, functions such as brake force recovery (recuperation) are possibly to be made possible. This makes, for example, an electric rear axle possible in addition to the transversely installed front main drive unit with permanent front axle drive.

SUMMARY OF THE INVENTION

This section provides a general summary of the disclosure, and is not a comprehensive disclosure of its full scope or all of its features.

It is an object of the invention to specify a transmission arrangement which allows efficient operation of an all wheel drive motor vehicle, in particular, with regard to costs and installation space.

The object is achieved by way of a transmission arrangement for the controllable distribution of a drive torque from an input element to at least one output element in an all wheel drive train of an all wheel drive motor vehicle, comprising an additional drive unit, a first transmission part region, the first transmission part region being drive-connected directly or indirectly to the additional drive unit, a second transmission part region, the first transmission part region being connected indirectly via the second transmission part region to the output element, and a selector element, it being possible for the selector element to be moved into three shifting positions, namely a first shifting position, in which the first transmission part region is drive-connected to the input element, a second shifting position, in which the first transmission part region is drive-connected to the second transmission part region, and a third shifting position, in which the first transmission part region is drive-connected neither to the input element nor to the second transmission part region.

The transmission arrangement according to the invention serves for the controllable distribution of a drive torque from an input element to at least one output element.

In accordance with the present invention, the transmission arrangement comprises an additional drive unit, a first transmission part region, a second transmission part region and a selector element.

In accordance with the invention, the first transmission part region is drive-connected directly or indirectly to the additional drive unit. In accordance with the invention, furthermore, the first transmission part region is connected indirectly via the second transmission part region to the output element.

The additional drive unit can be configured, for example, as an electric machine.

In accordance with the present invention, the selector element can be moved into three shifting positions, namely a first shifting position, a second shifting position and a third shifting position.

In accordance with the invention, the first transmission part region is drive-connected to the input element in the first shifting position of the selector element, and is drive-connected to the second transmission part region in the second shifting position. In the second shifting position of the selector element, the additional drive unit is therefore drive-connected to the output element via the drive connection of the first transmission part region and the second transmission part region. In the third shifting position of the selector element, in accordance with the present invention, the first transmission part region is drive-connected neither to the input element nor to the second transmission part region.

The configuration in accordance with the invention of the transmission arrangement makes particularly efficient operation of an all wheel drive motor vehicle possible. In particular, the realization of different operating modes, such as all wheel drive, recuperation and/or "disconnect", can be realized with a minimum expenditure and installation space requirement.

Developments of the invention are specified in the dependent claims, the description and the appended drawings.

The first transmission part region is preferably configured as a planetary gear mechanism, comprising an internal gear, a sun gear and at least one planetary gear which is arranged on a planetary gear carrier.

Furthermore, the second transmission part region is preferably configured as a differential gear mechanism with a differential cage, the differential cage forming the planetary gear carrier of the first transmission part region.

In the first shifting position of the selector element, the input element is preferably drive-connected to the internal gear of the planetary gear mechanism.

In this way, an all wheel drive mode can be produced in a simple way, which all wheel drive mode makes fully variable control possible of the torque which is transmitted at the output element (here, the torque is controlled via the supporting torque which is provided by the additional drive unit).

In the second shifting position of the selector element, the differential cage of the differential gear mechanism is preferably drive-connected to the internal gear of the planetary gear mechanism.

It is possible in this way to conduct the brake energy efficiently into the additional drive unit and thus to generate an optimized recuperation potential.

The transmission arrangement is preferably arranged on a secondary axle of an all wheel drive motor vehicle, the secondary axle being the output element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
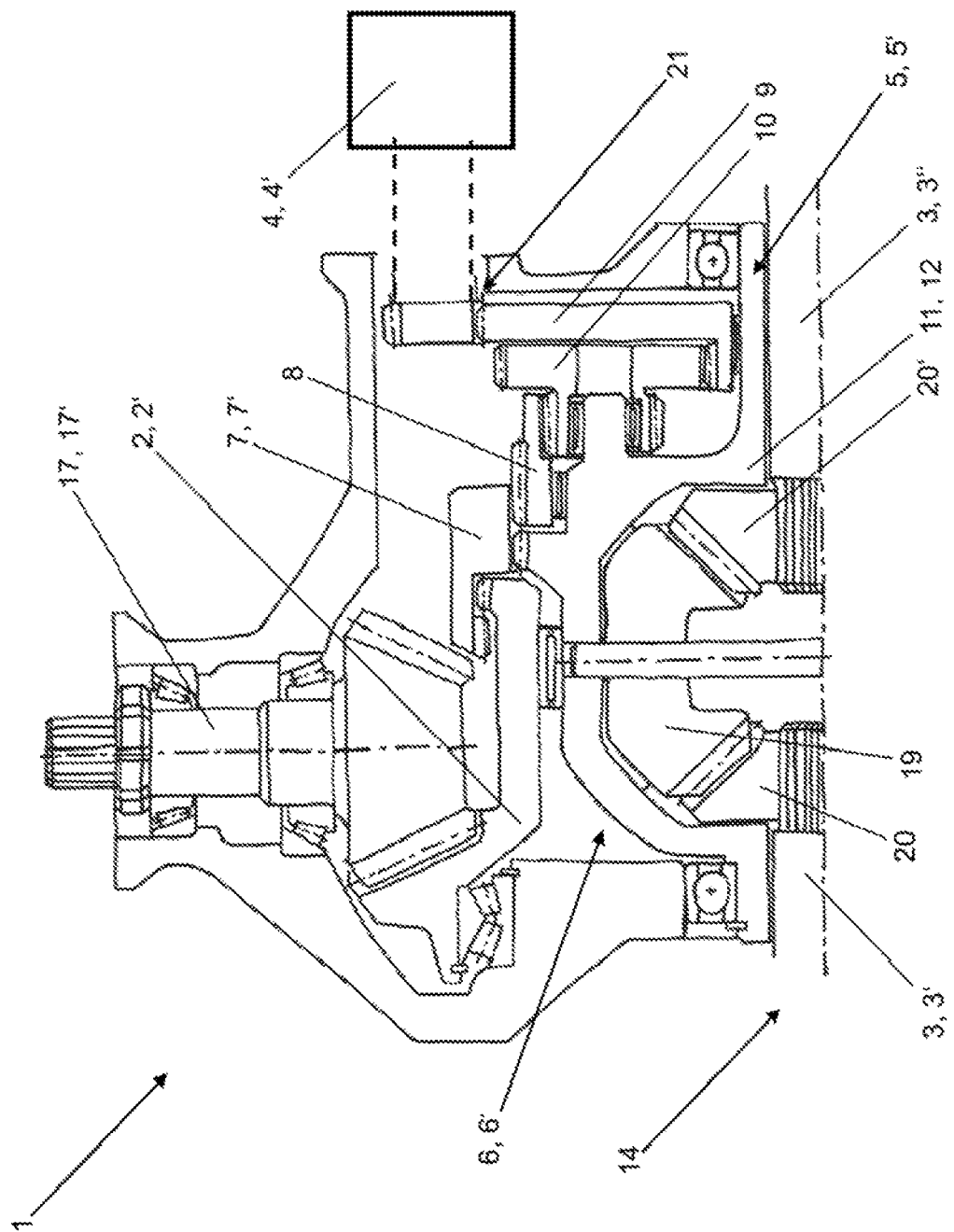
Figure 3:
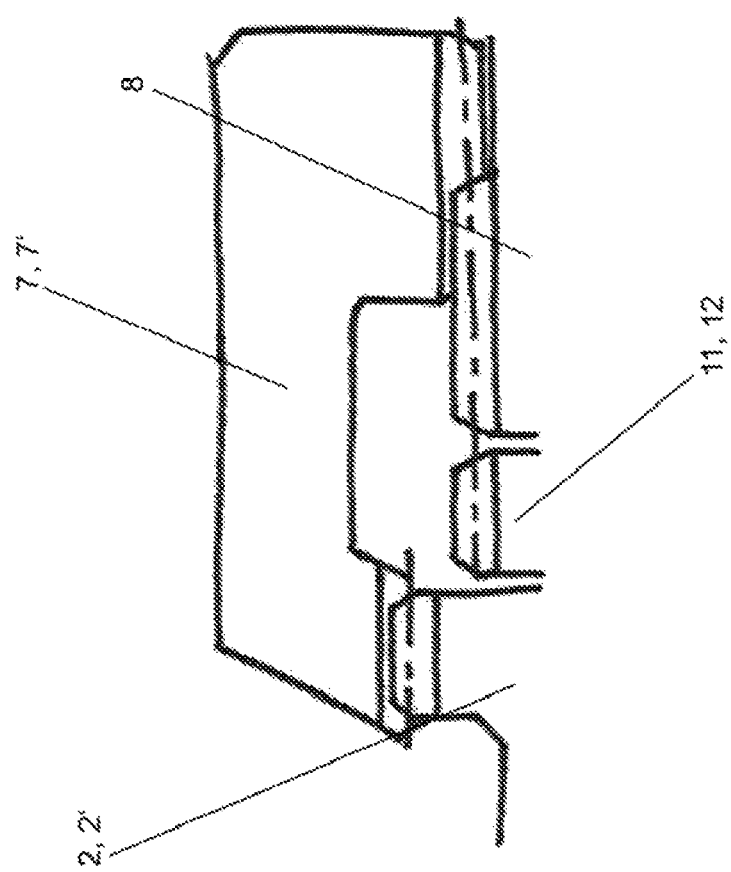
Figure 4:
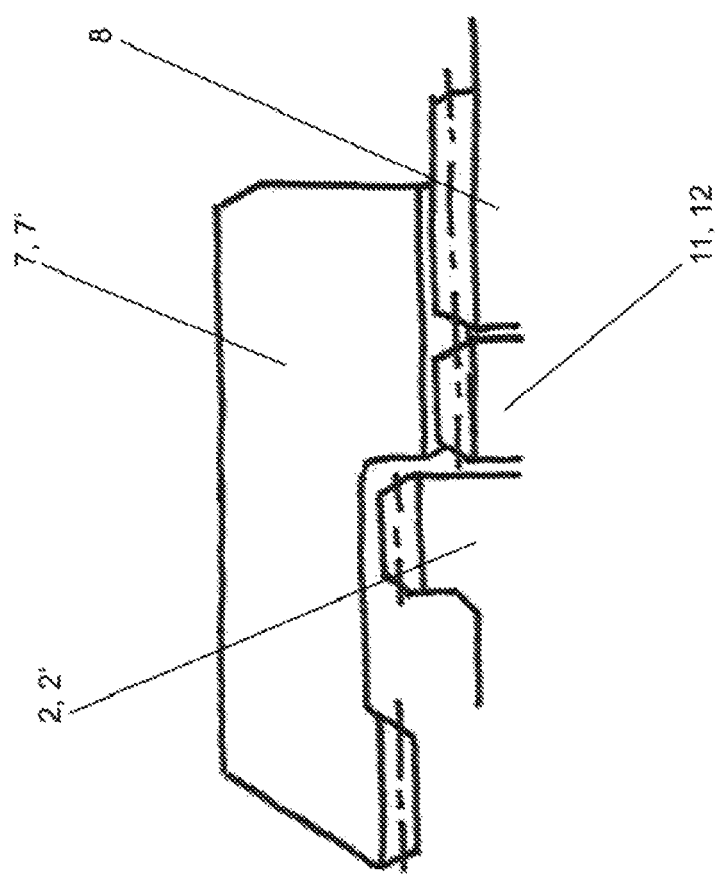
Figure 5:
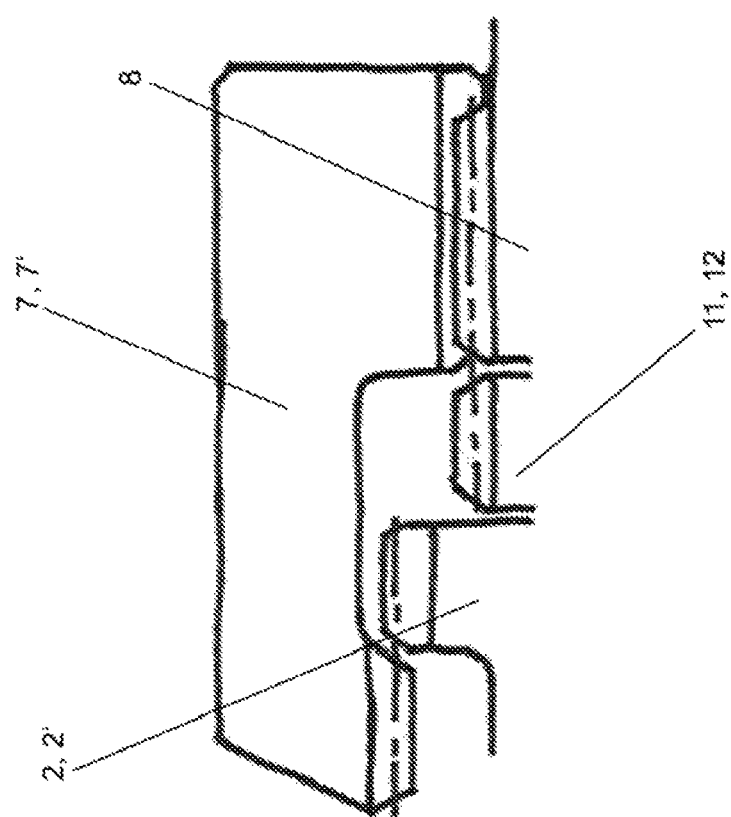

In the following text, the invention is described by way of example with reference to the drawings, in which FIG. 1 shows a fundamental architecture of an exemplary all wheel drive motor vehicle having a transmission arrangement in accordance with the invention, FIG. 2 shows a diagrammatic illustration of a detail of a transmission arrangement, FIG. 3 shows a detailed view from FIG. 2 with a selector element in a first shifting position, FIG. 4 shows a detailed view from FIG. 2 with a selector element in a second shifting position, and FIG. 5 shows a detailed view from FIG. 2 with a selector element in a third shifting position.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

FIG. 1 shows a diagrammatic view of an exemplary all wheel drive motor vehicle architecture with a transmission arrangement 1 in accordance with the invention. The motor vehicle drive takes place via two axles, namely a front axle 13 and a rear axle 14, the front axle 13 being configured as a permanently driven axle, that is to say as a primary axle, and the rear axle 14 being configured as an axle which is driven as required, that is to say as a secondary axle. In the present exemplary embodiment, a main drive unit 15 is arranged in the region of the front axle 13 transversely with respect to the driving direction. An arrangement of the main drive unit 15 along the driving direction is likewise conceivable in this context, however. The transmission arrangement 1 in accordance with the invention is arranged in the region of the rear axle 14. The main drive unit 15 is configured as an internal combustion engine 15' and is connected directly or indirectly to the transmission arrangement 1 on the rear axle 14 via a main transmission 16 and a torque-transmitting element 17, namely a prop shaft 17'.

In the following text, the transmission arrangement 1 in accordance with the invention will be described in greater detail in relation to the all wheel drive motor vehicle architecture shown in FIG. 1. All wheel drive motor vehicle architectures of different design with a transmission arrangement 1 in accordance with the invention are likewise conceivable, however.

FIG. 2 shows a diagrammatic illustration of a detail of a transmission arrangement 1 in accordance with the invention.

The transmission arrangement 1 has an additional drive unit 4, a first transmission part region 5, a second transmission part region 6 and a selector element 7.

The additional drive unit 4 of the transmission arrangement 1 is configured as an electric machine 4' and can be arranged either in parallel offset with respect to the rear axle 14 or coaxially on the rear axle 14.

The first transmission part region 5 is configured as a planetary gear mechanism 5' and serves firstly for power summing and secondly for the variable distribution of torque between the front axle 13 and the rear axle 14 in a selected all wheel drive mode. The exemplary planetary gear mechanism 5' which is shown diagrammatically in FIG. 2 comprises a rotatably mounted internal gear 8 with an external toothing system and an internal toothing system, a planetary gear carrier 11 with two planetary gears 10 (only one is visible in FIG. 2) which are mounted rotatably thereon, and a sun gear 9. The use of a planetary gear mechanism 5' of alternative configuration is likewise conceivable, however.

The second transmission part region 6 is configured as a differential gear mechanism 6' (also called a differential gear) and serves substantially for the equalization of the rotational speeds between the two rear wheels 18, 18' of the motor vehicle and for the distribution of the drive torque between the two rear wheels 18, 18' of the rear axle 14 of the motor vehicle. The differential gear mechanism 6' which is shown in FIG. 2 has a differential cage 12, two differential bevel gears 19 (only one is visible in FIG. 2) which are mounted rotatably on a pin, and two axle bevel gears 20, 20'. The differential bevel gears 19 are not drive-connected among one another, but they are drive-connected in each case to the axle bevel gears 20, 20'. The axle bevel gears 20, 20' are connected fixedly in each case to a half axle 3', 3" of the rear axle 14.

The first transmission part region 5 is drive-connected to the additional drive unit 4 indirectly, namely via a spur gear stage 21, and is secondly drive-connected to the two half axles 3', 3" of the rear axle 14 indirectly, namely via the second transmission part region 6. The additional drive unit 4 is drive-connected to the sun gear 9 of the planetary gear mechanism 5' via the spur gear stage 21.

Furthermore, the first transmission part region 5 can be drive-connected via the selector element 7 to the input element 2, to the second transmission part region 6 or to neither of them.

The selector element 7 is configured as a selector sleeve 7' and can be moved via an actuator unit (not shown) into a first shifting position, a second shifting position and a third shifting position. Here, the actuation of the selector sleeve 7' can take place, for example, electrically, electromechanically, electrohydraulically, hydraulically or pneumatically.

The first transmission part region 5 has a total of three interfaces; two torque inputs, namely selectively via the input element 2 and via the additional drive unit 4, and a torque output, namely via the second transmission part region 6 and two output elements 3. In the present case, the two half axles 3', 3" of the rear axle 14 represent the output elements 3.

The differential gear mechanism 6' is drive-connected via the differential cage 12 to the planetary gear mechanism 5', the differential cage 12 configuring the planetary gear carrier 11 of the planetary gear mechanism 5'.

Via the transmission arrangement 1, the all wheel drive motor vehicle in accordance with the architecture which is shown in FIG. 1 can be operated in three different operating modes:
 an all wheel drive mode,
 a recuperation mode, and
 a "disconnect" mode.

Said three operating modes can be selected via the selector sleeve 7'. If the selector sleeve 7' is situated in the first shifting position, the all wheel drive mode is activated; if the selector sleeve 7' is situated in the second shifting position, the recuperation mode is activated; and if the selector sleeve 7' is situated in the third shifting position, the "disconnect" mode is activated.

FIG. 3 shows a detailed view from FIG. 2 with the selector sleeve 7' in the first shifting position.

In the all wheel drive mode, the planetary gear mechanism 5' which uses the differential cage 12 of the differential gear mechanism 6' as a planetary gear carrier 11 is used as a power summing transmission. The sun gear 9 of the planetary gear mechanism 5' is drive-connected via the spur gear stage 21 to the electric machine 4'. The internal gear 8 is drive-connected via the selector sleeve 7' in the first shifting position to the input element 2, namely a ring gear 2' in the present case. The ring gear 2' in turn is drive-connected to the prop shaft 17'. In addition, the electric machine 4' controls the set torque, namely the entire torque which is output at the rear axle 14. In the case of an electric machine 4' which is not switched off or deactivated, no transmission of drive torque takes place from the internal combustion engine 15' to the two half axles 3', 3" of the rear axle 14; that is to say, in the case of a non-selected all wheel drive mode, no torque is transmitted to the rear axle 14.

The transmission of drive torque from the internal combustion engine 15' to the rear axle 14 and therefore the realization of the all wheel drive mode take place only when firstly the selector sleeve 7' is situated in the first shifting position and secondly the electric machine 4' is switched in or on, that is to say if the necessary supporting torque is provided via the sun gear 9 of the planetary gear mechanism 5' which is drive-connected to the electric machine 4' via the spur gear stage 21.

The electric machine 4' provides the torque at the sun gear 9, which torques serves as a supporting torque. Said supporting torque controls the overall torque of the rear axle 14, which overall torque is therefore directly proportional to the supporting torque which is provided by the electric machine 4'. The proportion of the torque which is delivered by the electric machine 4' is dependent on the static transmission ratio of the planetary gear mechanism 5'.

In the all wheel drive mode, the electric machine 4' therefore controls the overall torque which is output at the rear axle 14 via the set torque. The distribution of torque between the front axle 13 and the rear axle 14 can be set in a fully variable manner for all driving situations.

FIG. 4 shows a detailed view from FIG. 2 with the selector sleeve 7' in the second shifting position.

In order to exploit the maximum recuperation potential, that is to say brake energy recovery potential, it is necessary to switch into an operating mode, in which the entire brake energy is conducted into the electric machine 4'.

In the recuperation mode, the internal gear 8 of the planetary gear mechanism 5' is blocked with respect to the differential cage 12 of the differential gear mechanism 6' and accordingly with respect to the planetary gear carrier 11 of the planetary gear mechanism 5'. The differential cage 12 is disconnected from the ring gear 2'. In this way, the rear axle 14 is decoupled from the front axle 13 and therefore from the internal combustion engine 15'.

FIG. 5 shows a detailed view from FIG. 2 with the selector sleeve 7' in a third shifting position.

At operating points at which no all wheel drive mode is required, such as during driving at a constant speed of the motor vehicle or coasting of the motor vehicle, at least the rear axle 14 of the drive train is to be shut down. Here, the prop shaft 17' and the electric machine 4' are also not to rotate.

In the "disconnect" mode, the differential cage 12 of the differential gear mechanism 6' is disconnected from the ring gear 2'. Therefore, the prop shaft 17' and the ring gear 2' can be at a standstill while the differential cage 12 which is drive-connected to the rear wheels 18, 18' can rotate. The electric machine 4' is switched off or deactivated, and the rotational speed difference between the differential cage 12 and the electric machine 4' is equalized by the internal gear 8 and the planetary gears 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF DESIGNATIONS

1 Transmission arrangement
2 Input element
2' Ring gear
3 Output element
3', 3" Half axles (of the rear axle)
4 Additional drive unit 4' Electric machine
5 First transmission part region
5' Planetary gear mechanism
6 Second transmission part region
6' Differential gear mechanism
7 Selector element
7' Selector sleeve
8 Internal gear
9 Sun gear
10 Planetary gear
11 Planetary gear carrier
12 Differential cage
13 Front axle
14 Rear axle
15 Main drive unit
15' Internal combustion engine
16 Main transmission
17 Torque-transmitting element
17' Prop shaft
18, 18' Rear wheel
19 Differential bevel gear
20, 20' Axle bevel gear
21 Spur gear stage

What is claimed is:

1. A transmission arrangement for the controllable distribution of a drive torque from an input element to at least one output element in an all wheel drive train of an all wheel drive motor vehicle, comprising
an additional drive unit,
a first transmission part being drive-connected directly or indirectly to the additional drive unit, the first transmission part configured as a planetary gear mechanism including an internal gear, a sun gear, and at least one planetary gear arranged on a planetary gear carrier and in meshed engagement with the internal gear and the sun gear,
second transmission part, the first transmission part being connected indirectly via the second transmission part to the output element, the second transmission part configured as a differential gear mechanism including a differential cage formed as part of the planetary gear carrier, and
a selector element moveable between three shifting positions including a first shifting position in which the first transmission part is drive-connected to the input element, a second shifting position in which the first transmission part is drive-connected to the second transmission part, and a third shifting position in which the first transmission part is drive-connected neither to the input element nor to the second transmission part.

2. The transmission arrangement as claimed in claim 1, wherein, in the first shifting position of the selector element, the input element is drive-connected to the internal gear of the planetary gear mechanism.

3. The transmission arrangement as claimed in claim 1, wherein, in the second shifting position of the selector element, the differential cage of the differential gear mechanism is drive-connected to the internal gear of the planetary gear mechanism.

4. The transmission arrangement as claimed in claim 1, wherein the transmission arrangement is arranged on a secondary axle of the all wheel drive motor vehicle, and wherein the secondary axle being the output element.

5. The transmission arrangement as claimed in claim 1, wherein the additional drive unit includes an electric machine, and wherein the electric machine is drive-connected to the sun gear of the planetary gear mechanism.

6. The transmission arrangement as claimed in claim 5, wherein the selector element is a selector sleeve that is drive-connected to the internal gear and axially moveable between the three shifting positions via actuation of an actuator unit, wherein the selector sleeve is operable in the first shifting position to drive-connect the internal gear to the input element, wherein the selector sleeve is operable in the second shifting position to drive-connect the internal gear to the differential cage, and wherein the selector sleeve is operable in the third shifting position to disconnect the internal gear from both the input element and the differential cage.

7. The transmission arrangement as claimed in claim 6, wherein an all wheel drive mode is established when the selector sleeve is located in the first shifting position, wherein a recuperation mode is established when the selector sleeve is located in the second shifting position, and wherein a disconnect mode is established when the selector sleeve is located in the third shifting position.

8. The transmission arrangement as claimed in claim 7, wherein actuation of the electric machine when the all wheel drive mode is established acts to control the distribution of the drive torque transmitted from the input element to the at least one output element.

9. A transmission arrangement for the controllable distribution of a drive torque from an input element to at least one output element in an all wheel drive motor vehicle, comprising:
an additional drive unit;
a first transmission part being drive-connected directly or indirectly to the additional drive unit;
a second transmission part configured for indirectly drive-connecting the first transmission part to the output element; and
a selector element moveable between three shifting positions including a first shifting position whereat the first transmission part is drive-connected to the input element, a second shifting position whereat the first transmission part is drive-connected to the second transmission part, and a third shifting position whereat the first transmission part is not drive-connected to either the input element nor the second transmission part,
wherein the transmission arrangement is arranged on a secondary axle of the all wheel drive vehicle, and wherein the secondary axle being the output element.

10. The transmission arrangement of claim 9, wherein the first transmission part is a planetary gear mechanism including an internal gear, a sun gear, a planetary gear carrier, and a planetary gear rotatably supported from the planetary gear carrier and meshed with the internal gear and the sun gear, and wherein the second transmission part is a differential gear mechanism including a differential cage forming the planetary gear carrier, and a differential gearset disposed between the differential cage and the secondary axle.

11. The transmission arrangement of claim 10, wherein the selector element is drive-connected to the internal gear and is axially moveable between the three shifting positions via actuation of an actuator unit, wherein the selector element is operable in the first shifting position to drive-connect the internal gear to the input element, wherein the selector element is operable in the second shifting position to drive-connect the internal gear to the differential cage, and wherein the selector element is operable in the third shifting position to disconnect the internal gear from both the input element and the differential cage.

12. The transmission arrangement of claim 11, wherein the additional drive unit includes an electric machine drive-connected to the sun gear of the planetary gear mechanism, and wherein actuation of the electric machine when the selector element is located in the first shifting position establishes an all wheel drive mode.

13. A transmission arrangement for use in an all wheel drive motor vehicle having a main drive unit transmitting drive torque to a permanently driven primary axle and a main transmission unit for selectively transmitting drive torque from the main drive unit to a secondary axle, the transmission arrangement comprising:
   an input element driven by the main transmission unit;
   a differential gear mechanism having a differential cage and a differential gearset operably disposed between the differential cage and a pair of axle shafts associated with the secondary axle;
   a planetary gear mechanism having an internal gear, a sun gear, a planetary carrier formed by the differential cage, and at least one planet gear rotatably supported by the planetary carrier and meshed with both the internal gear and the sun gear;
   an electric machine drive-connected to the sun gear of the planetary gear mechanism; and
   a selector sleeve drive-connected to the internal gear and axially moveable between three distinct shifting positions via actuation of an actuator unit, wherein the selector sleeve is operable in a first shifting position to drive-connect the input element to the internal gear, wherein the selector sleeve is operable in a second shifting position to drive-connect the differential cage to the internal gear, and wherein the selector sleeve is operable in a third shifting position to disconnect the internal gear from both the input element and the differential cage.

14. The transmission arrangement of claim 13, wherein an all wheel drive mode is established when the selector sleeve is located in the first shifting position, wherein a recuperation mode is established when the selector sleeve is located in the second shifting position, and wherein a disconnect mode is established when the selector sleeve is located in the third shifting position.

15. The transmission arrangement of claim 14, wherein the drive torque transmitted by the main drive unit is varied between the primary axle and the secondary axle in response to establishment of the all wheel drive mode and the electric machine being actuated to transmit a supporting torque to the sun gear.

16. The transmission arrangement of claim 15, wherein the electric machine is drive-connected to the sun gear via a spur gear arrangement.

* * * * *